United States Patent [19]

Okuyama

[11] Patent Number: 5,037,130

[45] Date of Patent: Aug. 6, 1991

[54] KNEE PROTECTOR FOR AUTOMOTIVE VEHICLES

[75] Inventor: Hiroo Okuyama, Isehara, Japan

[73] Assignee: Nissan Motor Co., Ltd., Japan

[21] Appl. No.: 456,931

[22] Filed: Dec. 26, 1989

[30] Foreign Application Priority Data

Dec. 26, 1988 [JP] Japan .................................. 63-334683

[51] Int. Cl.$^5$ .............................................. B60R 21/04
[52] U.S. Cl. ....................................... 280/752; 296/70
[58] Field of Search ................... 280/751, 752; 296/70, 296/192

[56] References Cited

U.S. PATENT DOCUMENTS

| | | | |
|---|---|---|---|
| 3,930,665 | 1/1976 | Ikawa | 280/752 |
| 3,964,578 | 6/1976 | Campbell et al. | 280/752 |
| 3,984,128 | 10/1976 | Oehm et al. | 280/751 |
| 4,320,909 | 3/1982 | Nakamori et al. | 280/752 |
| 4,373,746 | 2/1983 | Okuyama | 280/752 |
| 4,421,343 | 12/1983 | Yoshitsugu | 280/752 |

*Primary Examiner*—Kenneth R. Rice
*Attorney, Agent, or Firm*—Leydig, Voit & Mayer

[57] ABSTRACT

A knee protector for use in automotive vehicles has a knee protector body located beneath an instrument panel and extending in the lateral direction of the vehicle opposite the knees of a passenger. Support members are connected between the knee protector body and a rigid portion of the vehicle body. Each support member includes a folding portion which folds upon collision impact. Each support member also includes a cushion member bridging the folding portion of the support member. The cushion member is formed of a material which can absorb collision energy. The folding portion absorbs collision impact by stable deformation.

11 Claims, 3 Drawing Sheets

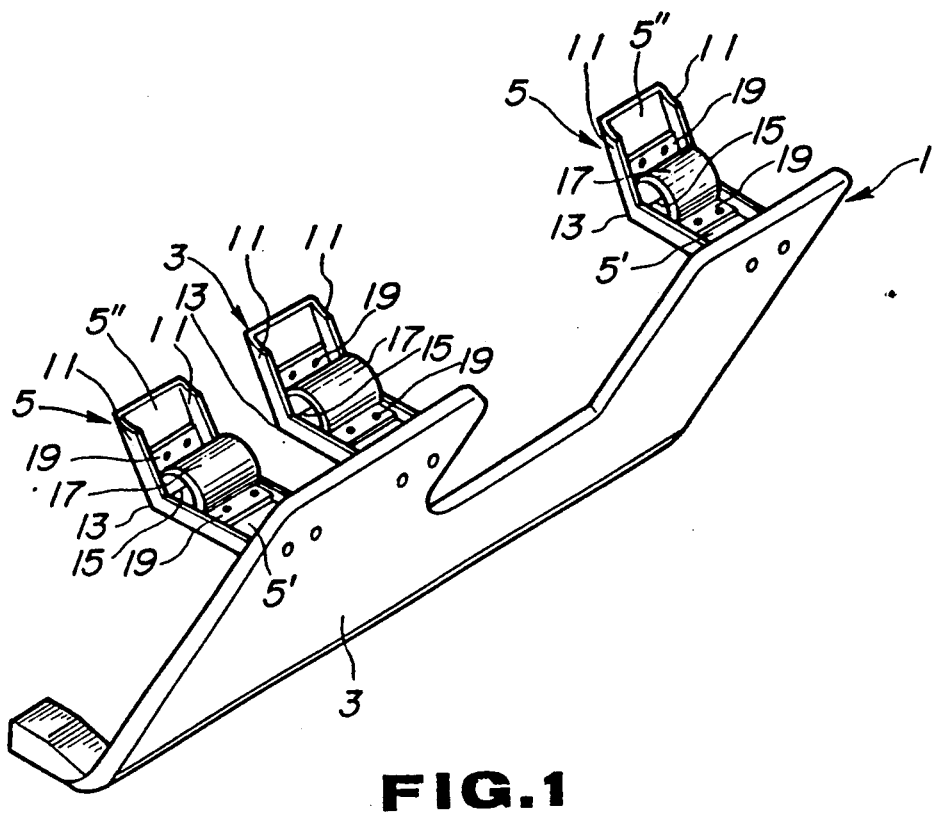
FIG. 1
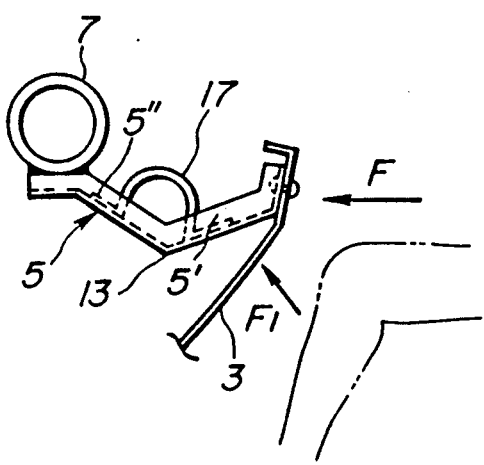 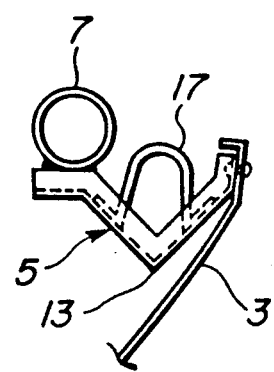 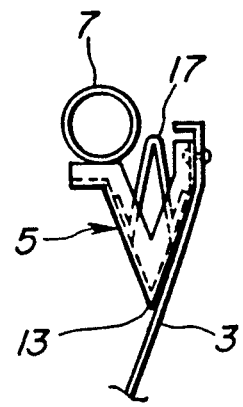
FIG. 2(a)   FIG. 2(b)   FIG. 2(c)

KNEE PROTECTOR FOR AUTOMOTIVE VEHICLES

BACKGROUND OF THE INVENTION

1. Field of the Invention

The present invention relates to a knee protector used in automotive vehicles which protects the knees of vehicle occupants in front seats when a collision occurs.

2. Background Art

Generally, when automotive vehicles are subjected to a of frontal collision, the upper body of the vehicle occupant in a front seat is held to the seat by the seat belt. However, because of possible deformation of the vehicle's interior by the collision, the knees of the occupant are in danger of violently contacting the column cover of the automotive vehicle or so forth. Therefore, knee protection becomes necessary as a safety feature.

Published Unexamined Utility Model No. 52-43234 discloses a system for leg protection. A protector which is made from metal, synthetic resin or such, is located under the lower part of an instrument panel. Certain protectors are multi-layered in the direction of the knees protecting them when the vehicle is involved in a collision.

Published Unexamined Japanese Utility Model No. 54-32445 discloses a system for protecting the knees of the occupant of a vehicle. A knee pad is located between a projecting portion under the steering column of the vehicle and the knees of the occupant. The pad is formed by collision-energy member which can be deformed by the pressure of the vehicle occupants' knees during a collision.

Japanese Published Unexamined Utility Model No. 57-47554 discloses a system for knee protection in which a support member of relatively soft construction connected to a knee pad as a shock absorber collapses when the knees of a vehicle occupant come into contact with the pad.

Japanese Published Examined Patent No. 53-30219 discloses a knee holding system having a hammock-like tension system.

In the knee protector arrangements such as mentioned above, absorption of kinetic energy is attempted by deforming a protector when a shock load is applied. Thus, the shock load applied to the occupant in the front seat above the knees is restricted to a constant acceptable level.

However, the direction of this shock load depends on leg position and other factors. Therefore, it will not always be the same direction, so that the deformation mode of the protector may be unstable and the load applied to knees is dispersed in various ranges. Thus, the load cannot always be restricted to an acceptable level.

SUMMARY OF THE INVENTION

Accordingly, it is an object of the present invention to provide a knee protector for automotive vehicles which can restrict a shock load to an acceptable level.

It is another object of the present invention to provide a knee protector for automotive vehicles which will always assume a predetermined deformation mode.

In order to accomplish the aforementioned and other objects a knee protector according to the present invention, has a knee protector body located beneath the instrument panel having a long side along the vehicle's width as a lower protector. A support member is connected between the knee protector body to the first member at a first end of the first portion and a strengthening member of the instrument panel at a second end of the second portion. The support member has a folding portion which is folded upon collision impact. A cushion member which can absorb collision energy bridges the folding portion.

According to this construction, the support member of the present invention is folded at the folding portion whenever collision impact is applied to the knee protector. Because the cushion member operates as a shock absorber, the support member is not folded violently. Furthermore, whichever direction the collision impact is applied from, the folding portion ensures that the first member will fold in a predetermined manner. Therefore, a stable deformation mode can be obtained and impact can be restricted within an acceptable range. Thus vehicle occupants' knees in the front seats are protected sufficiently.

BRIEF DESCRIPTION OF THE DRAWINGS

The present invention will be understood more clearly from the preferred embodiments described herebelow and from the appended drawings which illustrate the detailed construction of the embodiments but, should not be taken to limit the invention but are for explanation and understanding only.

In the drawings,

FIG. 1 is a perspective view of the present invention,

FIG. 2 (a), (b) and (c) are sectional views of how the protector operates,

DETAILED DESCRIPTION OF THE PREFERRED EMBODIMENTS

Figure 3:
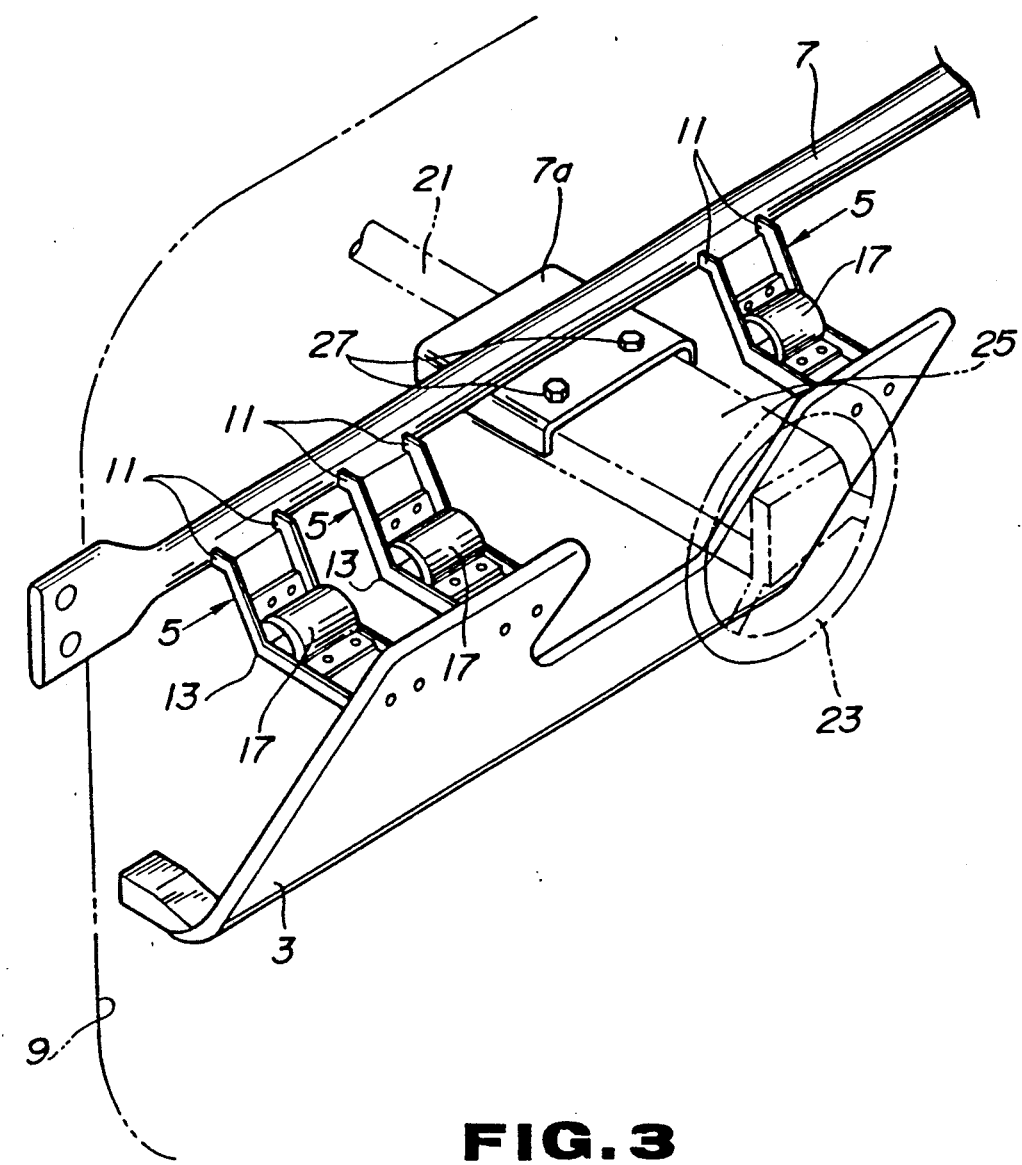
FIG. 3 is a perspective view of the protector installed on a steering member.

Referring now to FIG. 1, a knee protector 1 includes a knee protector body 3 extending in the width wise direction of the vehicle and a support member 5 having a first portion 5' and a second portion 5''. The first end of the first portion 5' of the support member 5 is mounted on the knee protector body 3 by fastening with machine screws, for example, and the support end of the second portion 5'' of the second member 5 is fastened to the instrument panel such as a steering member 7 as shown in FIG. 3 by welding. As an example, the embodiment is described in terms of a left-hand drive vehicle.

The knee protector body 3 is composed of an energy absorption material which is deformable. Its lower end is fastened to a bracket on the left side extending from a dash side panel 9, and is fastened to a lower dash panel (not shown) through a stay on its right side.

On the other hand, the support members 5 are, installed on three portions of the knee protector body 3. Two flange portions 11 are bent up from both sides of the second member 5 on substantially parallel vertical planes to extend perpendicularly from bottom of the support member 5.

A folding portion 13 is installed in the middle of the support member 5 to connect the second end of the first portion 5' and the first end of the support portion 5''. The second member 5 extends perpendicular from the knee protector body 3 and is prefolded upwardly along a fold line 15 of the folding portion 13. Thus, the support member 5 can be folded easily in a predetermined direction.

Figure 4:
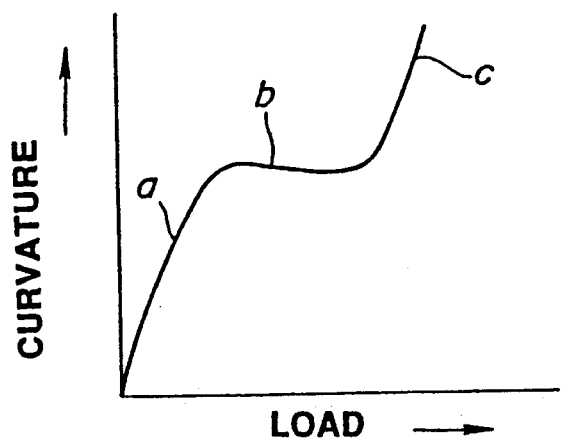
FIG. 4 is a graph of the characteristic relationship between the load and the curvature of the cushion member of the present invention.

Furthermore, a cushion member 17 formed of a bendable material is installed on the support member 5. The cushion member 17 bridges the fold line 15 of the folding portion 13 and forms an arc over the fold line 15. Flange portions 19 are fastened to the upper surface of the support member 5 by spot-welding. The thickness and curvature of the cushion member 17 are determined to obtain a curve as shown in the graph of FIG. 4. That is, a curve having a hold-out area a which curves successively relative to the load applied, an energy absorption area b which curves at a constant rate when the load reaches a predetermined level and restricts the shock load in a constant acceptable and 9 hold-out area c which curves successively again.

Referring now to FIG. 3, numeral 21 indicates a steering column of the automotive vehicle. The steering column 21 has a first end on which a steering wheel 23 is mounted and a second end which connects to a steering gear (not shown) penetrating a dash lower panel (not shown). A mounting bracket 25 of the steering column 21 is fastened to a mount 7a of a steering member 7 supported by bolts 27. The steering column 21 is the a well known energy absorption type column. When a load exceeding a predetermined load is applied to the steering wheel 23, the mounting bracket 25 is detached from the mount 7a along the direction of the shaft center line. The mount 7a and the mounting bracket 25 are connected via a spacer which operates as a fuse. The middle part of the steering member 7 is supported by a pair of steering stays (not shown) standing up from the floor tunnel and both ends of the steering member 7 are fastened to an instrument panel side bracket.

In the knee protector 1 constructed as mentioned above, the support member 5 is always folded at the folding portion 13 when a shock load F is applied to the knee protector body 3 as shown in FIG. 2 whether the direction of the load applied is F or F. At this time, the support member 5 is not folded violently because of the operation of the cushion member 17, so as stable mode of operation is obtained and the shock load can be restricted to an acceptable range.

Figure 5:
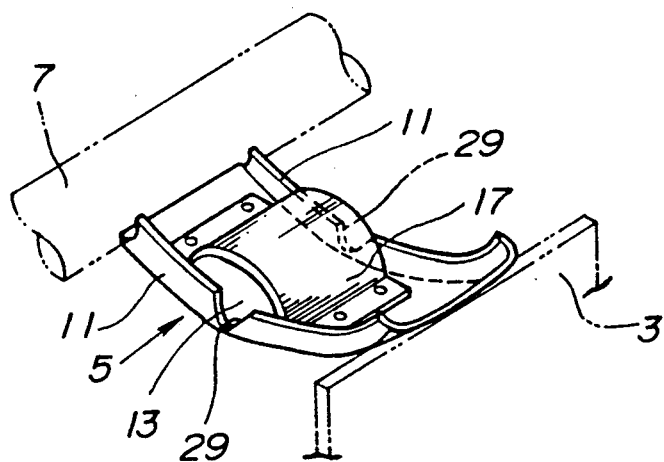
FIG. 5 and FIG. 6 are perspective views of other embodiments of the present invention.
Figure 6:
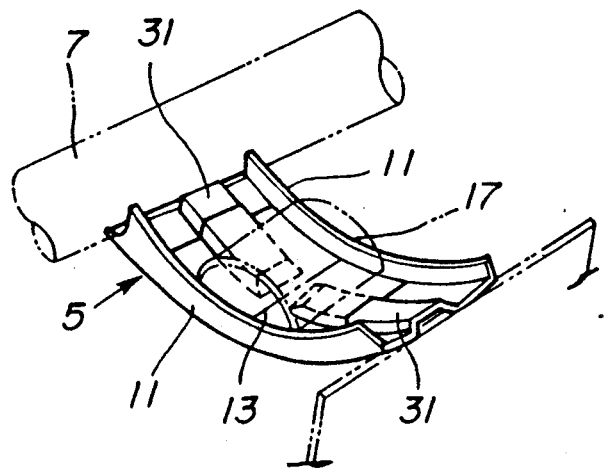

FIGS. 5 and 6 show other embodiments of the support member 5 of the present invention.

In the embodiment shown in FIG. 5, a support member 5 has flanges 11 bent up from both sides of the second member 5 with the cushion member 17 mounted thereon. Weakened portions 29 are cut out from the flanges 11 at the areas opposite which the cushion member 17 is disposed. Thus, the folding port 13 is formed.

Referring now to another embodiment shown in FIG. 6, the support member 5 has flanges 11, projecting from both sides of the support member 5, with cushion member 17 mounted thereon bridging the folding portion 13. Additionally, reinforcing ribs 31 are installed on the support member 5 between the flanges 11, leaving the folding portion 13 weakened at folding portion 13.

In the knee protectors of the second or third embodiments as mentioned above, stable deformation can be obtained. Moreover, in these constructions, no sharp portions are present which could damage a vehicle's electrical wiring, so wiring paths such as a wire harnesses need not be affected.

What is claimed is:

1. A knee protector for use in automotive vehicles comprising;
    a knee protector body disposed in a passenger compartment of a vehicle opposite the position assumed by the knees of a passenger when a passenger is seated in the passenger compartment and extending in the lateral direction of the vehicle;
    at least one support member for supporting the knee protector body, the support member having a first end connected to the knee protector body, a second end connected to a rigid portion of the body of the vehicle, and a folding portion between the first and second ends of the support member for enabling the support member to bend about a bending axis at the folding portion when a force exerted on the knee protector body by the knees of a passenger exceeds a prescribed level; and
    an arcuate cushion member having first and second ends connected to the support member and spanning the folding portion in substantially the form of an arch.

2. The knee protector as set forth in claim 1 wherein the support member has an angle formed therein at the folding portion.

3. The knee protector as set forth in claim 1, wherein the support member comprises first and second lateral edges and first and second flanges extending from the first and second lateral edges.

4. The knee protector as set forth in claim 3 wherein each flange has a cutout formed therein at the folding portion.

5. The knee protector as set forth in claim 1 wherein the knee protector body has an upper portion and a lower portion, the upper portion being connected to the support member and the lower portion being connected to a panel in the passenger compartment of the vehicle.

6. The knee protector as set forth in claim 5 wherein the knee protector body comprises a deformable energy absorption material.

7. The knee protector as set forth in claim 5 wherein the upper portion of the knee protector body is disposed to the rear of the lower portion of the knee protector body in the longitudinal direction of the vehicle.

8. The knee protector as set forth in claim 1 wherein the support member is an arcuate member having a surface describing a continuous curve at the folding portion.

9. The knee protector as set forth in claim 8 wherein the support member has first and second lateral edges having first and second flanges extending along the first and second lateral edges, respectively, each flange having a cutout formed therein at the folding portion.

10. The knee protector as set forth in claim 8 wherein the support member comprises first and second longitudinal reinforcing ribs on opposite sides of the folding portion.

11. A knee protector for an automotive vehicle comprising:
    a knee protector body comprising a deformable energy absorption material disposed in a passenger compartment of the vehicle opposite the position assumed by the knees of a passenger when a passenger is seated in the passenger compartment and extending in the lateral direction of the vehicle and having an upper portion and a lower portion connected to a panel inside the passenger compartment, the lower portion being forward of the upper portion in the longitudinal direction of the vehicle;

a support member having a first end connected to a rigid portion of the body of the vehicle, a second end connected to the upper portion of the knee protector body, a folding portion between the first and second ends that enables the support member to bend about a bending axis at the folding portion extending in the lateral direction of the vehicle, and flanges extending along lateral edges of the support member; and a cushion member having first and second ends secured to the support member and spanning the folding portion and having a smooth, arcuate shape between the first and second ends.

* * * * *